(12) United States Patent
Lu et al.

(10) Patent No.: US 11,914,142 B2
(45) Date of Patent: *Feb. 27, 2024

(54) LIGHT FIELD NEAR-EYE DISPLAY AND METHOD THEREOF FOR GENERATING VIRTUAL REALITY IMAGES

(71) Applicant: Coretronic Corporation, Hsin-Chu (TW)

(72) Inventors: Chih-Hung Lu, Hsin-Chu (TW); Jui-Yi Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/980,583

(22) Filed: Nov. 4, 2022

(65) Prior Publication Data
US 2023/0045962 A1 Feb. 16, 2023

Related U.S. Application Data

(63) Continuation of application No. 17/499,882, filed on Oct. 13, 2021, now Pat. No. 11,520,142.

(30) Foreign Application Priority Data

Jun. 17, 2021 (CN) .......................... 202110672253.3

(51) Int. Cl.
G02B 27/00 (2006.01)
G02B 27/01 (2006.01)
G06F 3/01 (2006.01)

(52) U.S. Cl.
CPC ..... *G02B 27/0093* (2013.01); *G02B 27/0172* (2013.01); *G06F 3/013* (2013.01); *G02B 2027/0187* (2013.01)

(58) Field of Classification Search
CPC ............ G02B 27/0093; G02B 27/0172; G02B 2027/0187; G02B 27/0179; G06F 3/013;
(Continued)

(56) References Cited

U.S. PATENT DOCUMENTS 10,560,689 B2 2/2020 Lapstun
10,642,311 B2 5/2020 Lanman et al.
(Continued)

FOREIGN PATENT DOCUMENTS

CN 110651236 A 1/2020
TW I696848 B 6/2020
(Continued)

*Primary Examiner* — Mihir K Rayan

(57) ABSTRACT

A method for generating virtual reality images and used in a light field near-eye display includes steps of: shifting a display image according to at least one change vector of a plurality of eye movement parameters, and calculating a compensation mask according to a simulated image and superimposing the compensation mask on a target image to generate a superimposed target image, wherein brightness distributions of the simulated image and the compensation mask are opposite to each other. The light field near-eye display is also provided. In this way, the light field near-eye display for generating virtual reality images and the method thereof can achieve the purpose of improving the uniformity of the image and expanding the eye box size.

11 Claims, 5 Drawing Sheets calculating a compensation mask (image) according to a simulated image and superimposing the compensation mask on a target image to generate a superimposed target image, wherein brightness distributions of the simulated image and the compensation mask are opposite to each other — S1 shifting a display image according to a change vector of a plurality of eye movement parameters, wherein the display image is converted from the superimposed target image — S3

(58) Field of Classification Search
CPC ....... G09G 2320/0233; G09G 2360/16; G09G 3/001

See application file for complete search history.

(56) References Cited

U.S. PATENT DOCUMENTS

| | | |
|---|---|---|
| 11,520,142 B1 * | 12/2022 | Lu .......................... G06F 3/013 |
| 2010/0207865 A1 * | 8/2010 | Auld .................... G09G 3/3611 |
| | | 445/3 |
| 2014/0184914 A1 * | 7/2014 | Oshima .................. G09G 5/026 |
| | | 348/564 |
| 2017/0171533 A1 | 6/2017 | Benitez et al. |
| 2019/0052866 A1 | 2/2019 | Chang et al. |
| 2019/0250418 A1 | 8/2019 | Lo et al. |
| 2020/0393678 A1 | 12/2020 | Leuenberger et al. |
| 2021/0033856 A1 | 2/2021 | Zhang et al. |

FOREIGN PATENT DOCUMENTS

| | | |
|---|---|---|
| TW | I720293 B | 3/2021 |
| WO | 2016050119 A1 | 4/2016 |

* cited by examiner calculating a compensation mask (image) according to a simulated image and superimposing the compensation mask on a target image to generate a superimposed target image, wherein brightness distributions of the simulated image and the compensation mask are opposite to each other — S1 shifting a display image according to a change vector of a plurality of eye movement parameters, wherein the display image is converted from the superimposed target image — S3

FIG. 2 generating the simulated image through a light field near-eye display simulation with a white field image — S11 generating the compensation mask according to a brightness value difference between each pixel of the white field image and a corresponding pixel of the simulated image — S13 multiplying a brightness value of each pixel of the target image by a value of a corresponding pixel of the compensation mask — S15

FIG. 3 establishing a spatial movement range of a plurality of sub-display images included in the display image according to the eyeball position — S31 tracking a change vector of the pupil position to shift positions of the plurality of sub-display images within the spatial movement range of each of the plurality of sub-display images — S33

FIG. 4

LIGHT FIELD NEAR-EYE DISPLAY AND METHOD THEREOF FOR GENERATING VIRTUAL REALITY IMAGES

CROSS-REFERENCE TO RELATED APPLICATIONS

This application is a continuation application of U.S. application Ser. No. 17/499,882, filed on Oct. 13, 2021, which claims the priority benefit of China application no. 202110672253.3, filed on Jun. 17, 2021. The entirety of the above-mentioned patent applications is hereby incorporated by reference herein and made a part of this specification.

FIELD OF THE INVENTION

The invention relates to a light field near-eye display technology, and more particularly to a light field near-eye display and a method thereof for generating virtual reality images.

BACKGROUND OF THE INVENTION

The light field near-eye display (LFNED) is currently one of the display technologies that can solve the vergence accommodation conflict. The light field near-eye display using a microlens array with a plurality of sub-lenses can combine a plurality of sub-images generated by the sub-lenses into a spatially three-dimensional virtual image. When the sub-images are overlapped and coveraged, the brightness of the virtual image will have an uneven brightness distribution due to the overlap and coverage of the sub-images. In addition, an eye box size is defined as a certain range within which the eyeball can move and view the complete image. This range is limited by the area where the beams of the sub-lens converge or intersect. When the eyeball deviates from the eye box size, the user may view a "broken image" due to the eyeball deviates from the area where the light beams converge or intersect. Therefore, there is a need for a light field near-eye display technology that can improve the uniformity of image brightness and expand the eye box size.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a light field near-eye display and its method for generating virtual reality images that can improve the uniformity of image brightness and expand the eye box size.

Other advantages and objects of the invention may be further illustrated by the technical features broadly embodied and described as follows.

In order to achieve one or part or all of the above-mentioned purposes or other purposes, the light field near-eye display for generating virtual reality images provided by the invention includes an eye tracking module and a light field display module. The eye tracking module is configured to provide a plurality of eye movement parameters; and the light field display module is configured to shift a display image according to at least one change vector of the plurality of eye movement parameters, and the light field display module is configured to calculate a compensation mask according to a simulated image and superimpose the compensation mask on a target image to generate a superimposed target image, wherein brightness distributions of the simulated image and the compensation mask are opposite to each other.

In order to achieve one or part or all of the above-mentioned purposes or other purposes, the method for generating virtual reality images and used in a light field near-eye display provided by the invention includes steps of: shifting a display image according to at least one change vector of a plurality of eye movement parameters, and calculating a compensation mask according to a simulated image and superimposing the compensation mask on a target image to generate a superimposed target image, wherein brightness distributions of the simulated image and the compensation mask are opposite to each other.

The light field near-eye display and its method for generating virtual reality images according to the invention superimpose a compensation mask for compensating brightness on the target image to compensate for the uneven brightness of the target image, and dynamically shift the display image corresponding to the target image according to the eye movement parameters. Thus, the uniformity of the brightness of the image can be improved and the eye box size can be enlarged.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 is a flowchart of a method for generating virtual reality images according to an embodiment of the invention;

FIG. 3 is a flowchart of calculating a compensation mask according to a simulated image and superimposing the compensation mask to a target image according to an embodiment of the invention;

FIG. 4 is a flow chart of shifting a display image according to a change vector of a plurality of eye movement parameters according to an embodiment of the invention;

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
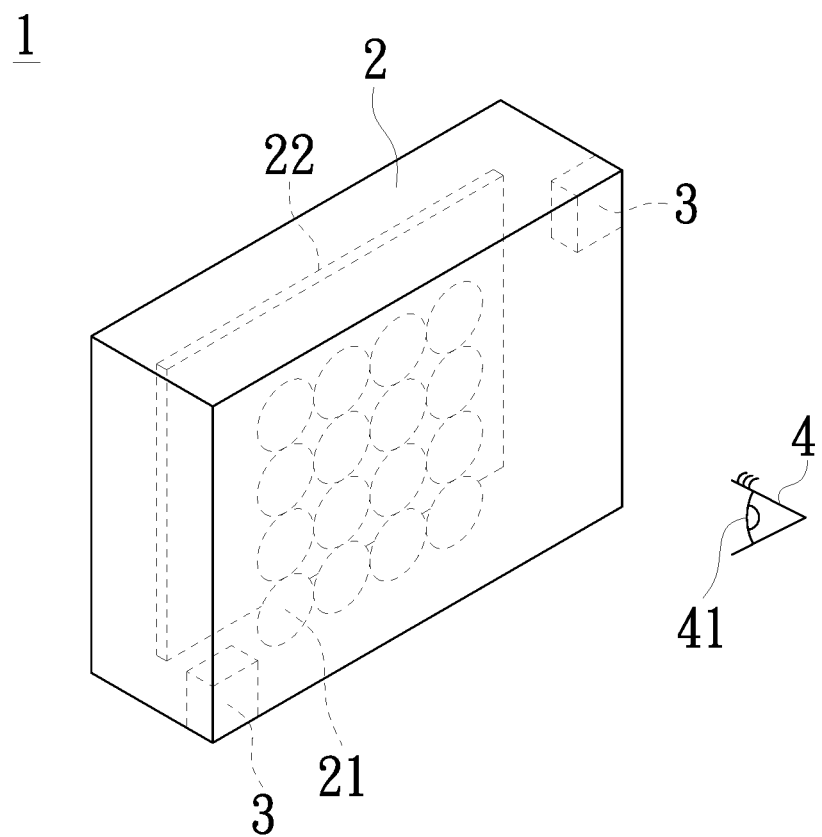
FIG. 1 is a schematic view of a light field near-eye display according to an embodiment of the invention.

FIG. 1 is a schematic view of a light field near-eye display according to an embodiment of the invention. Please refer to FIG. 1. The light field near-eye display 1 of the embodiment includes a light field display module 2 and an eye tracking module 3. The eye tracking module 3 is connected to the light field display module 2. The light field display module 2 has a plurality of sub-lenses 21 and a display panel 22. The sub-lenses 21 are, for example, a micro-lens array. The display panel 22 is configured to display a display image. The display image includes a plurality of sub-display images. The eyeball 4 can view a virtual reality image formed by superimposing the sub-display images through the sub-lenses 21. The eye tracking module 3 is configured to track (monitor) a plurality of eye movement parameters. The eye movement parameters include a distance between an eyeball position and a predetermined position, a distance between a pupil position and the predetermined position, or a size of a pupil 41, wherein the predetermined position is, for example, in the center of the display panel 22. It should be noted that the position and quantity of the eye tracking module 3 in the light field near-eye display 1 in FIG. 1 are only examples, and those skilled in the art can select the position where the eye tracking module 3 is placed in the light field near-eye display 1 and the quantity of the eye tracking module 3 according to the actual needs, and the invention is not limited to this. It should be noted that the light field display module 2 can be configured to convert a target image into the sub-display images to be displayed on the display panel 22 (that is, the display image is converted from the target image), thus, the virtual reality image received by the eyeball 4 is similar to the target image.

FIG. 2 is a flowchart of a method for generating virtual reality images according to an embodiment of the invention. Please refer to FIGS. 1 and 2 together. In order to improve the image brightness uniformity and expand the eye box size, the light field near-eye display 1 of the embodiment of the invention is configured to perform a method for generating virtual reality images. The light field display module 2 is configured to calculate a compensation mask according to a simulated image and superimpose the compensation mask on the target image to generate a superimposed target image, wherein the brightness distributions of the simulated image and the compensation mask are opposite to each other. The eye tracking module 3 is configured to provide the eye movement parameters, and the light field display module 3 is further configured to shift the display image according to a change vector of the eye movement parameters, wherein the display image is converted from the superimposed target image. It should be noted that the method for generating virtual reality images according to the embodiment of the invention takes the light field display module 2 executing the operation as an example, but the invention is not limited to this. In other implementations, all or part of the steps may be executed by the eye tracking module 3 or other processors or may also be executed by other light field near-eye displays, and the invention is not limited to this. In detail, the method for generating virtual reality images of this embodiment includes a step S1: calculating a compensation mask (image) according to a simulated image and superimposing the compensation mask on a target image to generate a superimposed target image, wherein brightness distributions of the simulated image and the compensation mask are opposite to each other; and a step S3: shifting a display image according to a change vector of a plurality of eye movement parameters, wherein the display image is converted from the superimposed target image. In addition, it should be noted that in the method for generating virtual reality images according to the embodiment of the invention, the steps S1 and S3 can be interchanged without priority (i.e., shifting the display image converted from the target image, and superimposing the compensation mask on the display image), and the invention is not limited to this.

As shown in FIG. 3, the step S1 includes a sub-step S11: generating the simulated image through a light field near-eye display simulation with a white field image, wherein the white field image is a grayscale image (single grayscale or multi grayscale image), a checkerboard image, or a line image; a sub-step S13: generating the compensation mask according to a brightness value difference between each pixel of the white field image and a corresponding pixel of the simulated image; and a sub-step S15: multiplying a brightness value of each pixel of the target image by a value of a corresponding pixel of the compensation mask. In this way, the target image after brightness compensation can be generated (i.e., generating a superimposed target image), so that the image viewed by the human eye has higher image brightness uniformity.

For example, when a general light field display module displays an image based on a white image with uniform brightness (all brightness values are the same), the eyeball 4 can view the virtual reality image formed by superimposing the virtual sub-images of the white image through the sub-lenses 21. The brightness distribution of the virtual reality image may cause the brightness distribution (different brightness values) to produce a grid-like image due to the superimpose spacing, proportion and shape between the virtual sub-images. Therefore, the virtual reality image may have the problem of uneven brightness, that is, the general light field display module cannot present a virtual reality image with uniform brightness like the original white image. The light field display module 2 in this embodiment compares the brightness value of each pixel of the white field image with the brightness value of the corresponding pixel in the simulated image to obtain the brightness value difference of each pixel, thereby generating a compensation mask with the brightness value difference. Finally, the compensation mask is superimposed on the target image to be displayed by the light field display module 2, so that the brightness value of each pixel in the target image is superimposed by the brightness value difference of the corresponding pixel in the compensation mask. In this way, the virtual reality image viewed by the user is a white picture image with uniform brightness.

In another embodiment, the brightness normalization can be further performed after the brightness value of each pixel in the target image is superimposed by the brightness value difference of the corresponding pixel in the compensation mask, so as to scale the distribution of the brightness value between 0 and 1 or between −1 and 1 to simplify calculations.

Figure 5:
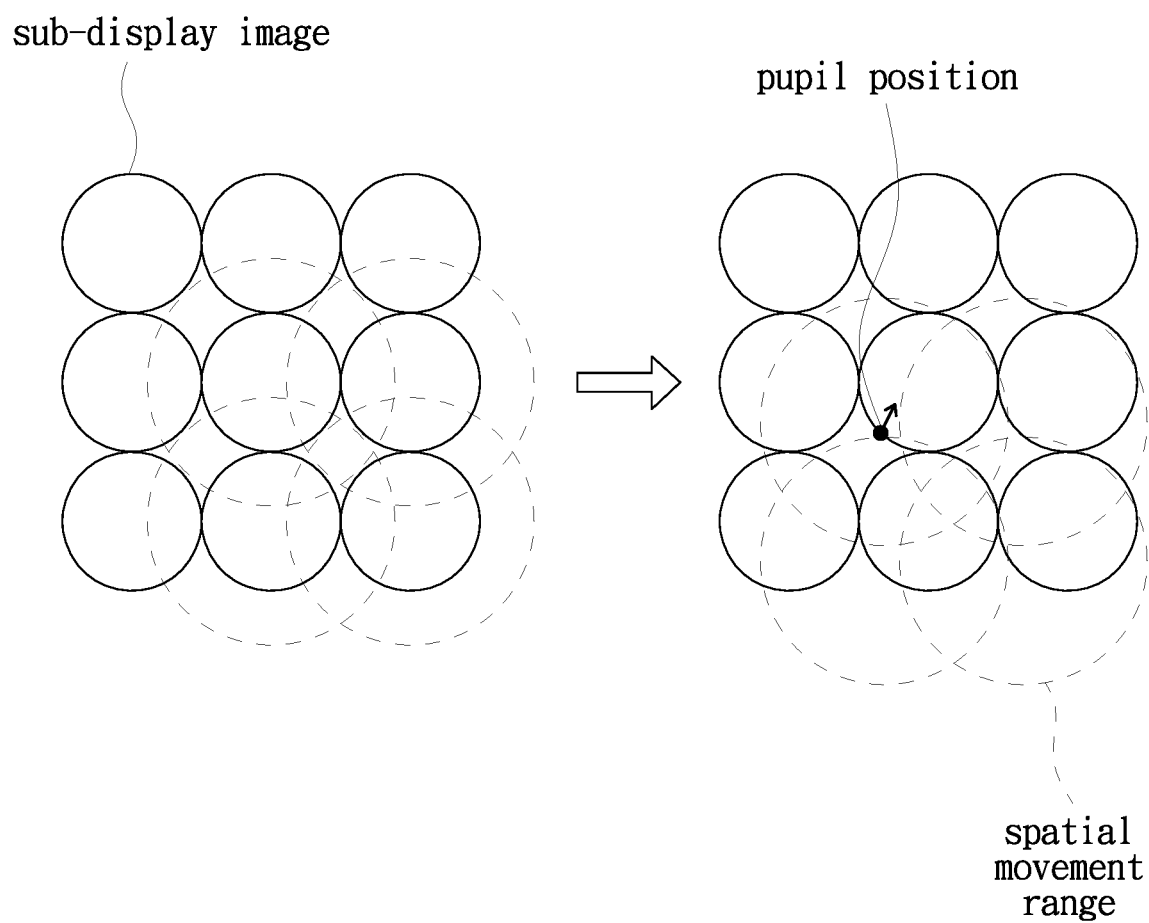
FIG. 5 is a schematic view of expanding the eye box size according to an embodiment of the invention.

FIG. 4 is a flow chart of shifting a display image according to a change vector of a plurality of eye movement parameters according to an embodiment of the invention. FIG. 5 is a schematic view of expanding the eye box size according to an embodiment of the invention. Please refer to FIGS. 1, 4 and 5 together. The step S3 includes a sub-step S31: establishing a spatial movement range of a plurality of sub-display images included in the display image according to the eyeball position; and a sub-step S33: tracking a change vector of the pupil position to shift the position of each sub-display image within the spatial movement range of each sub-display image. In this way, the display image can be shifted.

Specifically, as shown in FIG. 5, the light field display module 2 establishes the spatial movement range (dashed circle) of each sub-display image (solid circle) according to the eyeball position provided by the eye tracking module 3, so that the light field display module 2 can calculate the displacement vector (such as displacement distance and displacement direction) of each sub-display image by an interpolation calculation method between the spatial coordinates corresponding to the center and the boundary of the spatial movement range according to the movement distance and movement direction of the pupil 41 relative to the predetermined position provided by the eye tracking module 3, so that each sub-display image moves within its spatial movement range (that is, the position of the spatial movement range is fixed, for example), wherein the predetermined position of each sub-display image is located in the center of the spatial movement range, and the displacement direction and displacement distance of each sub-display image are approximately the same as each other. In this way, the eye box size can be expanded by the method provided by the invention, wherein the eye box size can be expanded by more than 6 mm on the left and right sides. For example, the distance between the eyeball position and the predetermined position can be between 0 mm and 6 mm, and a complete virtual reality image can be seen on the left and right sides.

Figure 6A:
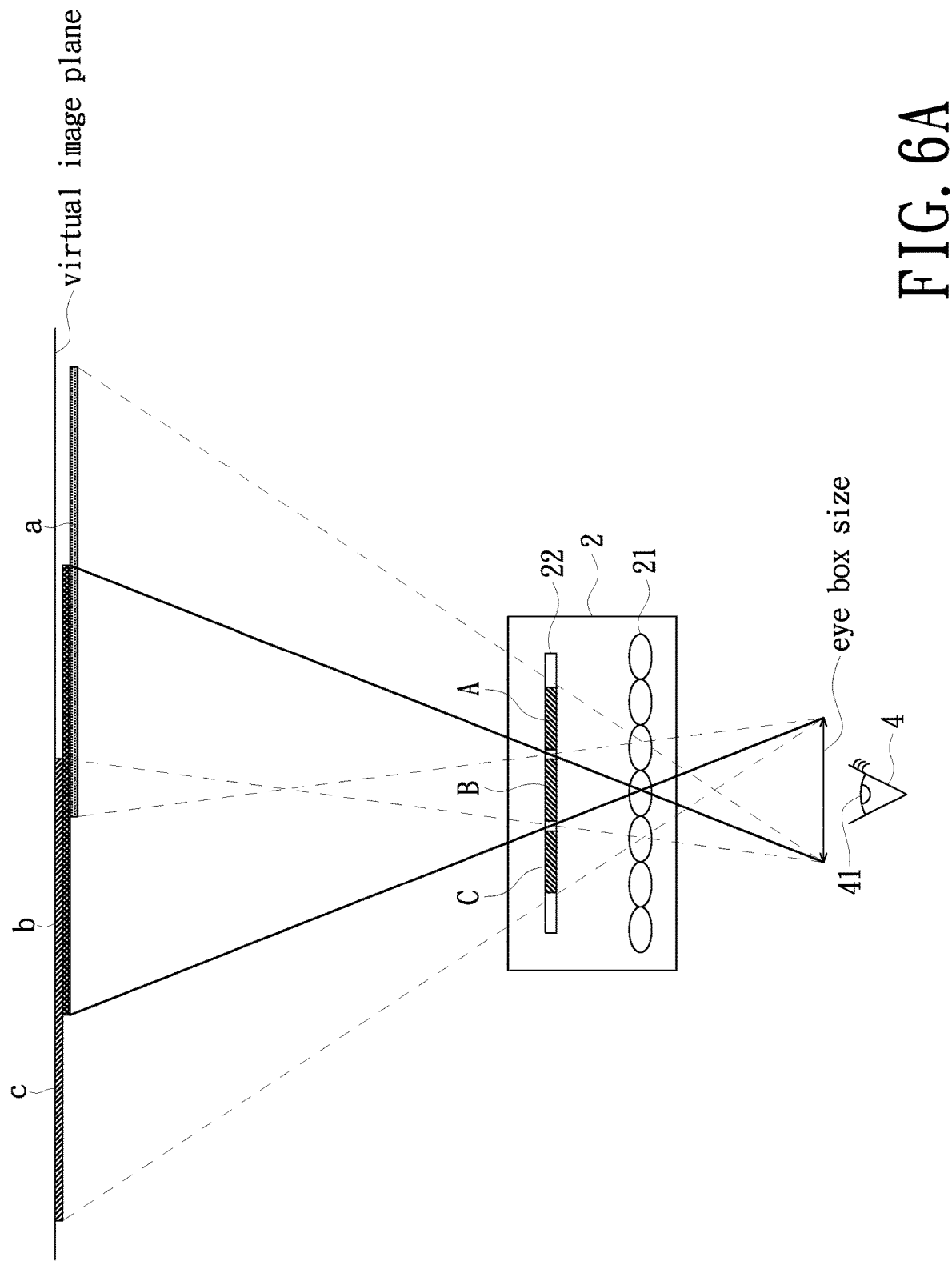
FIG. 6A is a schematic view of an operation of an eye box size according to an embodiment of the invention.
Figure 6B:
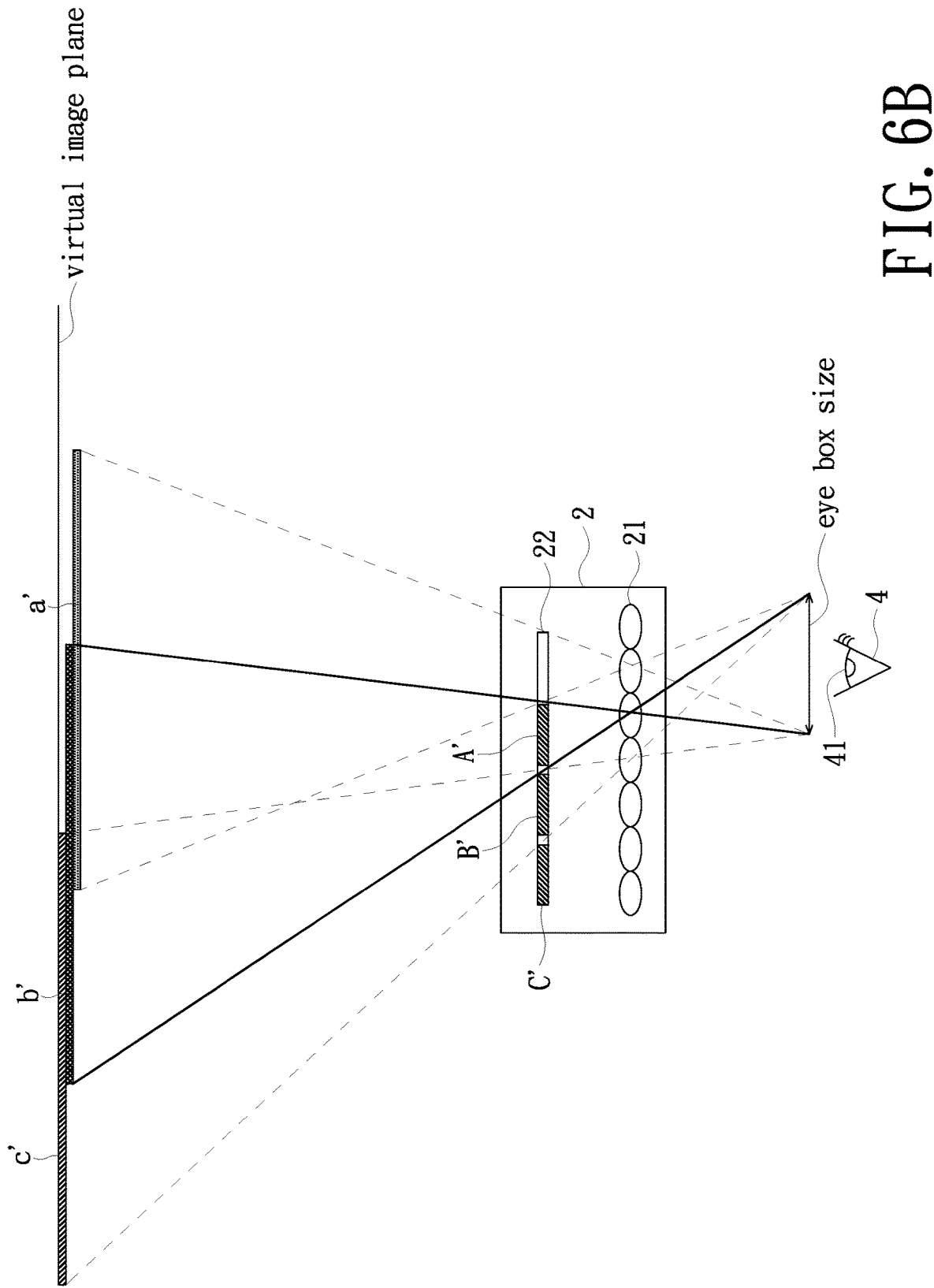
FIG. 6B is a schematic view of an operation of an eye box size according to another embodiment of the invention.

FIG. 6A is a schematic view of an operation of an eye box size according to an embodiment of the invention. FIG. 6B is a schematic view of an operation of an eye box size according to another embodiment of the invention. As shown in FIGS. 6A and 6B, the displacement direction and displacement distance of each sub-display image are opposite to the deviation direction of the eyeball position when the eyeball position deviates from the predetermined position. In one example, when the eyeball position is not deviated (as shown in FIG. 6A), the sub-display images A, B and C present the respective virtual sub-images a, b and c through the sub-lenses 21, and these virtual sub-images a, b and c are partially interlaced with each other to form a superimposed image. When the eyeball position deviates to the right (as shown in FIG. 6B), the eye tracking module 3 corrects the sub-display images A, B and C to shift to the left, and the deviated positions of the sub-display images A, B, and C are the coverage areas of the light projected by the deviated eye box size to form deviated sub-display images A', B' and C'. The virtual sub-images a', b' and c' are presented through the sub-lenses 21 to achieve the purpose of expanding the eye box size. It should be noted that the eye tracking module 3 can track the deviation and rotation of the eyeball position in any direction, and the invention is not limited to the above examples.

In summary, the light field near-eye display and its method for generating virtual reality images according to the invention superimpose a compensation mask for compensating brightness on the target image to compensate for the uneven brightness of the target image, and dynamically shift the display image corresponding to the target image according to the eye movement parameters. Thus, the uniformity of the brightness of the image can be improved and the eye box size can be enlarged.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A method for generating virtual reality images and used in a light field near-eye display, the method comprising steps of:
   shifting a display image according to at least one change vector of a plurality of eye movement parameters; and
   calculating a compensation mask according to a simulated image and superimposing the compensation mask on a target image to generate a superimposed target image, wherein brightness distributions of the simulated image and the compensation mask are opposite to each other.

2. The method for generating virtual reality images according to claim 1, wherein the plurality of eye movement parameters comprise a distance between an eyeball position and a predetermined position, a distance between a pupil position and the predetermined position, or a size of a pupil.

3. The method for generating virtual reality images according to claim 1, further comprising:
   generating the simulated image through a light field near-eye display simulation with a white field image; and
   generating the compensation mask according to a brightness value difference between each pixel of the white field image and a corresponding pixel of the simulated image.

4. The method for generating virtual reality images according to claim 3, wherein the white field image is a grayscale image, a checkerboard image, or a line image.

5. The method for generating virtual reality images according to claim 1, further comprising:
   multiplying a brightness value of each pixel of the target image by a value of a corresponding pixel of the compensation mask.

6. The method for generating virtual reality images according to claim 1, further comprising:
   establishing a spatial movement range of a plurality of sub-display images included in the display image according to the eyeball position; and
   tracking a change vector of the pupil position to shift positions of the plurality of sub-display images within the spatial movement range of each of the plurality of sub-display images.

7. The method for generating virtual reality images according to claim 6, wherein shifting the position of each of the plurality of sub-display images within the spatial movement range is calculating a displacement vector of each of the plurality of sub-display images by interpolation calculation between spatial coordinates corresponding to a center and a boundary of the spatial movement range of each of the plurality of sub-display images.

8. The method for generating virtual reality images according to claim 6, wherein when the eyeball position deviates from a predetermined position, a displacement direction of each of the plurality of sub-display images and a deviation direction of the eyeball position are opposite to each other.

9. The method for generating virtual reality images according to claim 2, wherein the distance between the eyeball position and the predetermined position is between 0 mm and 6 mm.

10. The method for generating virtual reality images according to claim 1, wherein the display image is converted from the target image.

11. A light field near-eye display, comprising an eye tracking module and a light field display module, wherein:
    the eye tracking module is configured to provide a plurality of eye movement parameters; and
    the light field display module is configured to shift a display image according to at least one change vector of the plurality of eye movement parameters, and the light field display module is configured to calculate a compensation mask according to a simulated image and superimpose the compensation mask on a target image to generate a superimposed target image, wherein brightness distributions of the simulated image and the compensation mask are opposite to each other.

* * * * *